United States Patent
Nakaya

(10) Patent No.: US 8,292,113 B2
(45) Date of Patent: Oct. 23, 2012

(54) PUSH-UP DEVICE FOR FUEL LID

(75) Inventor: Hiroyuki Nakaya, Utsunomiya (JP)

(73) Assignee: Nifco Inc., Yokohama-Shi (JP)

( * ) Notice: Subject to any disclaimer, the term of this patent is extended or adjusted under 35 U.S.C. 154(b) by 883 days.

(21) Appl. No.: 12/226,203

(22) PCT Filed: Jan. 31, 2007

(86) PCT No.: PCT/JP2007/051639
§ 371 (c)(1),
(2), (4) Date: Dec. 31, 2008

(87) PCT Pub. No.: WO2007/122835
PCT Pub. Date: Nov. 1, 2007

(65) Prior Publication Data
US 2009/0139991 A1   Jun. 4, 2009

(30) Foreign Application Priority Data

Apr. 25, 2006 (JP) ................................. 2006-121302

(51) Int. Cl.
*B65D 45/00* (2006.01)
*B65D 43/26* (2006.01)
*B62D 25/00* (2006.01)
(52) U.S. Cl. ...... 220/315; 220/263; 220/264; 296/97.22
(58) Field of Classification Search .................. 220/315, 220/262–264; 296/97.22
See application file for complete search history.

(56) References Cited

U.S. PATENT DOCUMENTS

| 6,869,114 B2 * | 3/2005 | Ueki .................. 292/341.17 |
| 7,380,861 B2 * | 6/2008 | Engel .................. 296/97.22 |
| 2005/0268432 A1 | 12/2005 | Migli |

FOREIGN PATENT DOCUMENTS

| DE | 196 50 594 | 6/1998 |
| EP | 1 018 588 A1 | 7/2000 |
| EP | 1 249 570 A1 | 10/2002 |
| JP | 2002-327558 | 11/2002 |
| JP | 2004-106584 | 4/2004 |
| JP | 2005-125495 | 5/2005 |

* cited by examiner

*Primary Examiner* — Robin Hylton
(74) *Attorney, Agent, or Firm* — Manabu Kanesaka

(57) ABSTRACT

A push-up device for a fuel lid includes a holder adapted to be attached to a panel under the fuel lid, a cylindrical sleeve disposed in the holder and having a plurality of elongated grooves and a plurality of short grooves alternately arranged in a vertical direction at equal intervals in an inner surface thereof, a spring member disposed in the holder, a push rod disposed in the holder to protrude outwardly from the holder and engaging the spring member, and a cam disposed between the push rod and the cylindrical sleeve. When a depressing force is applied to the push rod in a fuel lid closing state, the cam located in the shoot grooves is moved to the elongated grooves, and when the depressing force is applied to the push rod, the cam located in the elongated grooves is moved to the short grooves.

5 Claims, 8 Drawing Sheets

PUSH-UP DEVICE FOR FUEL LID

TECHNICAL FIELD

The present invention relates to a push-up device, which is adapted to push out a fuel lid in an opening direction by a push-push system, the fuel lid being mounted to a vehicle body.

BACKGROUND ART

FIG. 8 shows the fuel lid device disclosed in Patent Document 1 listed below. In the disclosed structure, a fuel lid (hereinbelow, referred to as the lid) 14 is mounted to the body 31 of a vehicle 11 through a hinge 21 so as to be flush with the vehicle body 11 in a closed position and expose a fuel cap 37 of a refueling inlet in an open position. The lid 14 has a locking strip 23 and an abutting part 41 disposed on an inner side thereof. The vehicle body 31 has a locking system 35 and a rod-opening system 40 disposed therein. The locking system 35 is brought into engagement with the locking strip 23 to lock the lid 14 in the closed position. The locking system is unlocked by an unlocking operation through an opener in the vehicle. The rod-opening system 40 includes an opening rod 15, which is supported so as to get in and out and is biased in a protruding direction. In the rod-opening system 40 thus constructed, when the locking system 35 is unlocked for fuel supply, the opening rod 15 is projected from an retracting position, being brought into contact with the abutting part 41 under the biasing action, to push out the lid 14 in an opening direction by a certain amount (a degree to which e.g. a finger is allowed to be put in for an opening operation). When the lid 14 is closed, the opening rod 15 is retracted in a direction to reduce the protruding length against the biasing action.

When the lid is closed, the opening rod 15 applies a pushing force to a counterpart of the lid 14 through the abutting part 41 while the lid 14 is locked by the locking system. In this case, the lid 14 is urged to swing about a line 25 connecting between the locking strip 23 and the hinge 21 since the opening rod 15 is disposed at a lower position than the locking system 35. In order to deal with this problem, the disclosed structure is configured so that the lid 14 has an upper end configured to be brought into contact with a size-adjusting member 29 disposed on a receiving portion 28 of the vehicle body 31 to prevent the upper end from getting in the vehicle body than needed for arranging an outer side thereof close to the upper end flush with the outer side of the vehicle body.

On the other hand, Patent Document 2 listed below discloses a push-up device, which pushes out a lid in an opening direction through, e.g. the push rod of a push-push system when the lid is depressed and the application of the depressing force is stopped in such a state that the lid is unlocked from a locking system. The disclosed device includes a cylindrical bottomed holder, a sleeve coupled to an upper side of the holder, a push rod disposed in the holder so as to protrude through a through hole formed in an upper side of the sleeve, heart-shaped cam grooves formed in opposed lateral sides of the push rod, a spring member disposed in the holder so as to bias the push rod in a protruding direction, a pin supported in the holder so as to be swingable and cause both ends to follow the heart-shaped cam grooves, and a cover coupled to a leading end of the push rod protruding from the sleeve.

The push-push system is configured so that the push rod is held in a retracted position having a protruding length reduced by the relationship between the pin and the heart-shaped cam grooves, and that when the push rod is released from being held by depressing the push rod through the lid, the push rod is switched to a protruding position having a protruding length increased by the biasing force of the spring member. Specifically, when the lid is closed, the push rod is set in the retracted position, and when the push rod is depressed through the lid, the push rod is released from being held in the retracted position with the result that the lid is pushed out by an action that is caused when the push rod is switched to the protruding position.

Patent Document 1: JP-A-2004-106584
Patent Document 2: DE-A-19650594

DISCLOSURE OF THE INVENTION

Problems that the Invention is to Solve

The push-push system according to Patent Document 2 is more advantageous than the rod-opening system according to Patent Document 1 in that the lid is not subjected to a pushing load in the closed position since the push rod is held in the retracted position when the lid is closed. The applicant has examined the push-push system according to Patent Document 2. In the structure wherein the push rod is held in the retracted position through the heart-shaped cam grooves and the pin, it is necessary to form the cam grooves in both lateral sides of the push rod, to bring the pin formed in a substantially U-character shape in engagement with the cam grooves on both lateral sides from outward, and to support the pin so as to be swingable with respect to the holder, for example. For these reasons, the push-push system is subjected to some limitations in being assembled to a vehicle body since it is difficult to reduce the size of the push-push system. Further, it is likely that the push rod is unintentionally released from the retracted position by impact transmitted from the vehicle body when the lid is closed.

It is an object of the present invention to solve the above-mentioned problems and to provide a push-up device, which is easily made smaller and reduce the likelihood of incorrect actions occurring.

Means of Solving the Problems

In order to attain the above-mentioned object, the present invention provides a push-up device, which is adapted to push up a fuel lid in an opening direction through a push rod or the like of a push-push system after unlocking a locking system, the fuel lid being mounted to a vehicle body through a hinge, and which is characterized in that the push-push system being configured to be of such a rotary cam type that the push rod has cams formed on a peripheral portion thereof so as to be configured to be brought into engagement with and out of a plurality of guides in sequence, the guides being formed on a fixed part; and that when a depressing force is applied to the fuel lid toward the vehicle body from a closing state, and when the application of the depressing force is stopped, the push rod is released, based on rotation, from being held by a combination of the guides and the cams at a retracted position with a protruding length deceased, followed by increasing the protruding length under a biasing force and switching the push-push system to a protruding position to push out the fuel lid. The push-push system is held (brought into engagement) at the retracted position where the push rod is retracted with reference to the fixed holder and the like. The push rod is released from being held by depressing the fuel lid toward the vehicle body and stopping the application of the depressing force. At the same time as the push rod is released from being held, the push rod is switched to the protruding position by the biasing force.

It is preferred that the above-mentioned push-up device be specifically configured as follows:

(a) The device includes the push rod; a cylindrical bottomed holder configured to be mounted to the vehicle body so as to slidably dispose the push rod therein; a sleeve coupled to the holder, serving to pass outward a leading portion of the push rod disposed in the holder and including the guides; and a spring member disposed in the holder so as to store the depressing force by a pushing movement toward a closing direction of the fuel lid.

(b) The push rod is divided into two parts, and one of the two parts is rotatably coupled to the other part.

(c) The cams are rotatably disposed on an outer peripheral portion of the push rod.

(d) The push-up device further includes a flexible covering material, which has a lower peripheral portion mounted to the holder and covers a portion of the push rod protruding from the sleeve.

Effect of the Invention

The push-push system according to the present invention is configured to be of such a rotary cam type that the push rod has the cams formed on the peripheral portion thereof, and that when a depressing force is applied to the fuel lid toward the vehicle body in a closing direction, and when the application of the depressing force is stopped, the push-push system is released, by rotation, from the state to be held at the retracted position, followed by increasing the protruding length under the biasing force and switching the push-push system to the protruding position to push out the fuel lid. Thus, it is possible to easily make the push-up device smaller to increase the degree of freedom in designing in mounting to the vehicle body and to reduce the likelihood of incorrect actions occurring, thereby improving reliability.

When the push-up device according to the present invention is configured to include the push rod; a cylindrical bottom holder configured to be mounted to the vehicle body so as to slidable dispose the push rod therein; a sleeve coupled to the holder, serving to pass outward a leading portion of the push rod disposed in the holder and including the guides; and a spring member disposed in the holder so as to store the biasing force by a depressing movement toward a closing direction of the fuel lid, it is possible to simply make a rotary cam type of push-push system with a small number of parts in comparison with the device disclosed in Patent Document 2. When the push-up device according to the present invention is configured so that the push rod is divided into two parts and when one of the two parts is rotatably coupled to the other part, e.g. only a portion of the rod with the cams can be set to be rotatable, and a leading portion of the rod can be set not to be rotatable as in, e.g. the modifications of FIG. 5 and FIG. 6 because the push rod is divided. Thus, it is possible to improve switching characteristic.

When the push-up device according to the present invention is configured so that the cams are rotatably disposed on an outer peripheral portion of the push rod, it is possible to improve, e.g. switching characteristic by disposing the cams on the push rod so as to be rotatable. When the push-up device according to the present invention is configured so as to include a flexible covering material, which has a lower peripheral portion mounted to the holder and covers a portion of the push rod protruding from the sleeve, it is possible to reliably provide the push-up device with dustproof and antifouling effects by the flexible covering material.

BEST MODE FOR CARRYING OUT THE INVENTION

Now, an embodiment of the present invention will be described in reference to the accompanying drawings. Description will be made in the order of the structure, an operation and modifications of the push-up device according to the present invention.

(Structure)

Figure 1A:
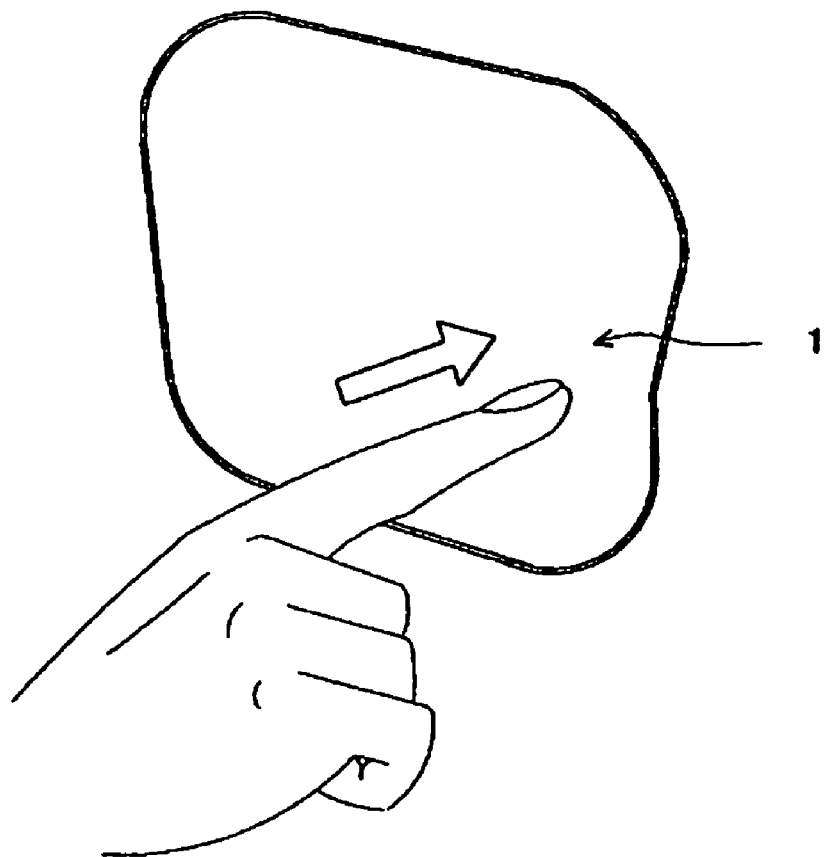
FIGS. 1(a) and (b) are schematic views showing how the push-up device according to an embodiment of the present invention is disposed and how a lid is opened and closed.
Figure 8:
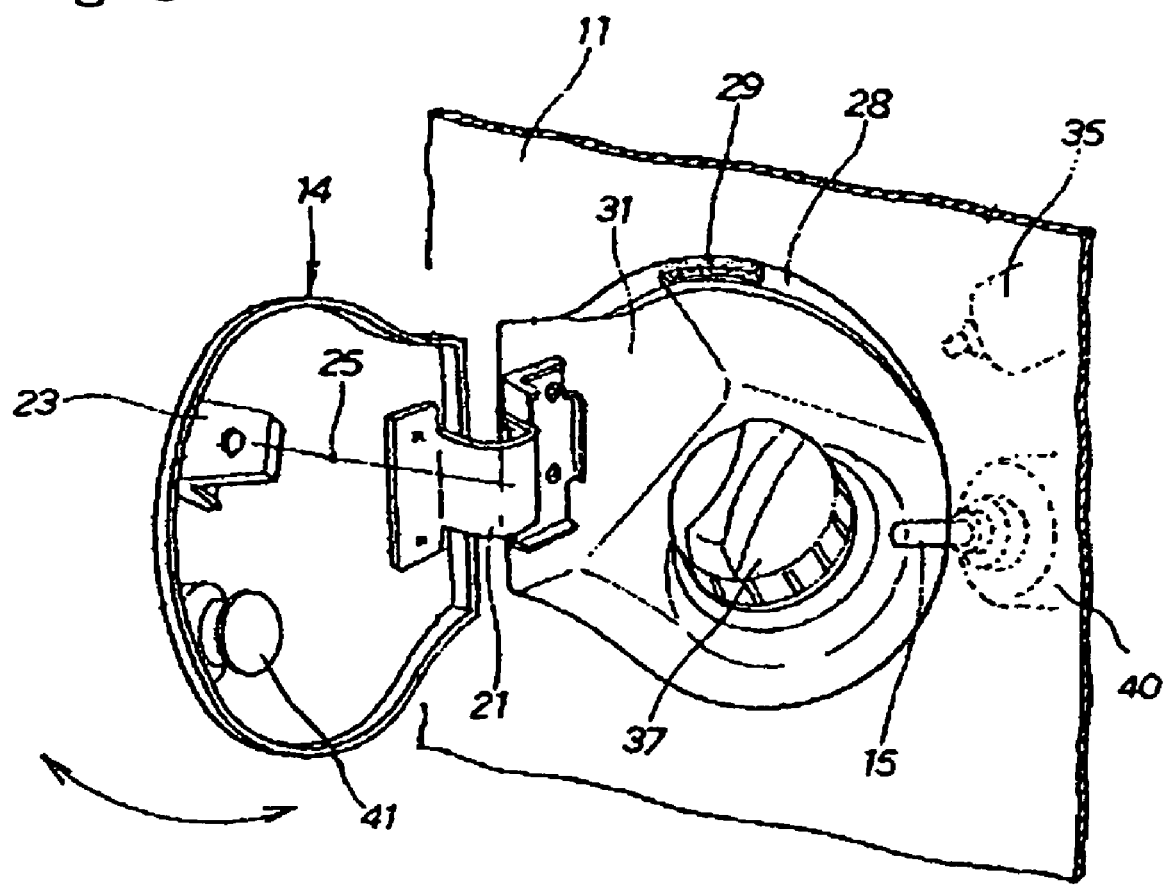
FIG. 8 is a schematic view of the structure of the device disclosed in Patent Document 1.

In FIGS. 1(a) and (b), reference numeral 1 designates a lid. The lid 1 is supported by a counterpart of a body panel through a hinge 2 so as to be opened and closed, and is biased in a closing direction by, e.g. an unshown spring. When the lid is set in a closed position shown in FIG. 1(a), the lid is locked by an unshown locking system. The lid is unlocked by, e.g. an unlocking operation through an opener in the vehicle or an unlocking operation in conjunction with an operation for releasing a door lock. Although the locking system, its related parts and like are not shown in FIGS. 1(a) and (b), these members are the same as conventional ones. For example, for the purpose of locking, the locking system is disposed on the body panel and is configured to be brought into and out of contact with, e.g. a lock strip disposed on an inner side of the lid 1 as shown in FIG. 8.

Figure 1B:
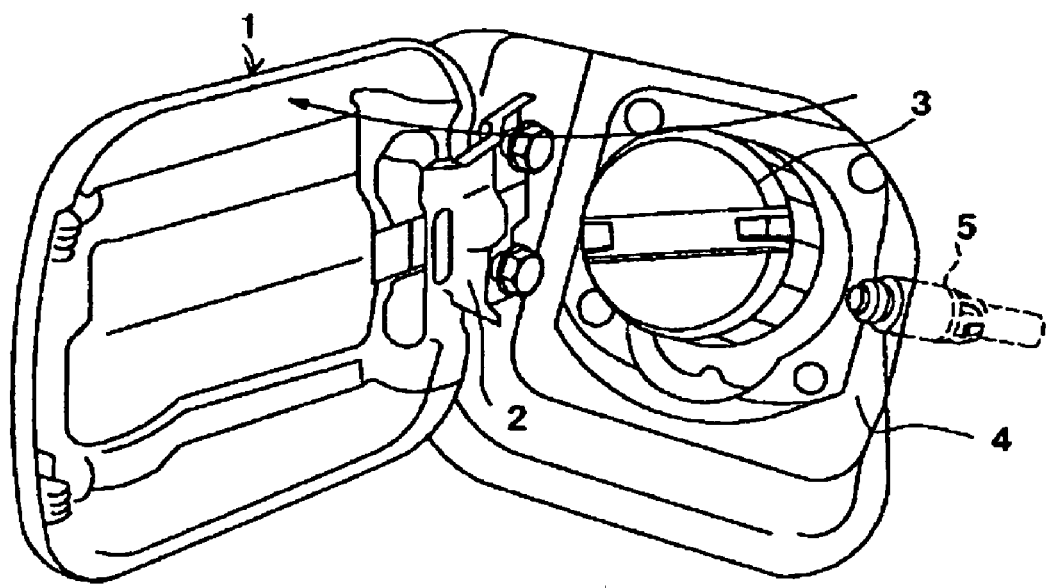

When the lid is set in the closed position, even if the locking system is unlocked, the absence of a handgrip makes a user puzzled since the lid is flush with an outer side of the body panel. When the lid is depressed, followed by stopping the application of the depressing force, the lid is automatically semi-opened as shown in FIG. 1(b). In this manner, a screw cap 3, which has been screwed on a refueling opening, is exposed from a recessed portion of the body panel, which has been covered with the lid (hereinbelow, referred to the body panel as the inner panel), and it is possible to feed fuel by unscrewing the cap 3.

Reference numeral 5 designates a push-up device as the essential part of the present invention. The push-up device 5 is mounted to a portion of the inner panel 4 confronting the opening and closing end or the free end of the lid 1. The push-up device is configured so that the lid 1 is pushed out in an opening direction through, e.g. a push rod 8 of a push-push system when the opening and closing end of the lid 1 is depressed by, e.g. a fingertip after unlocking the locking system, and when the application of the depressing force is stopped.

Figure 2A:
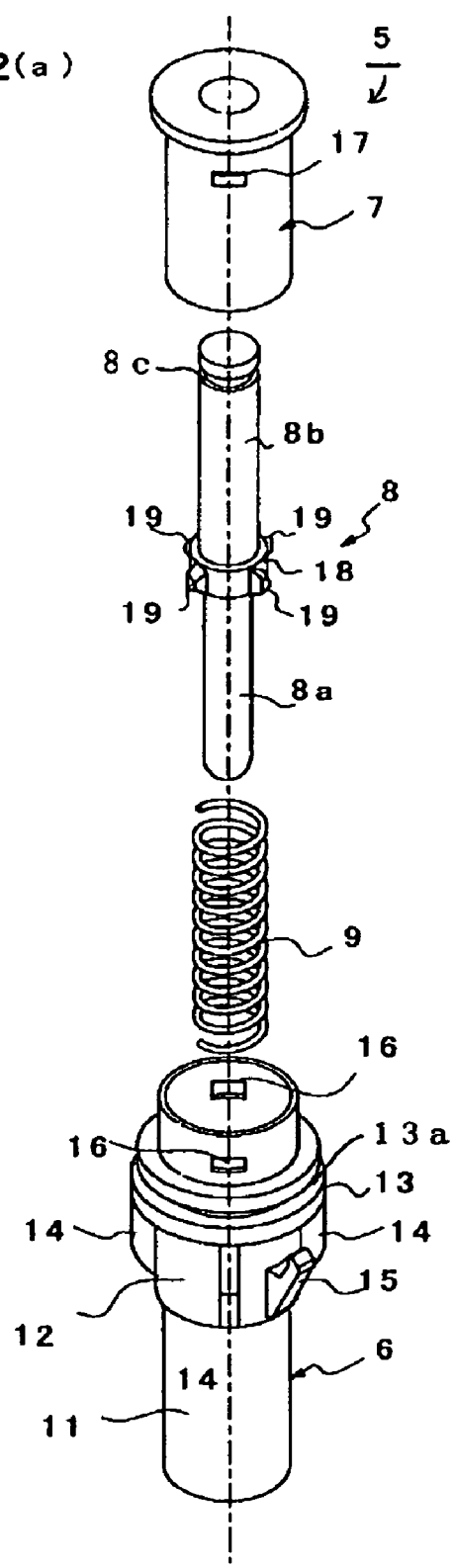
FIGS. 2(a) and (b) are an exploded perspective view of the push-up device and a view similar thereto but partly shown in section.
Figure 2B:
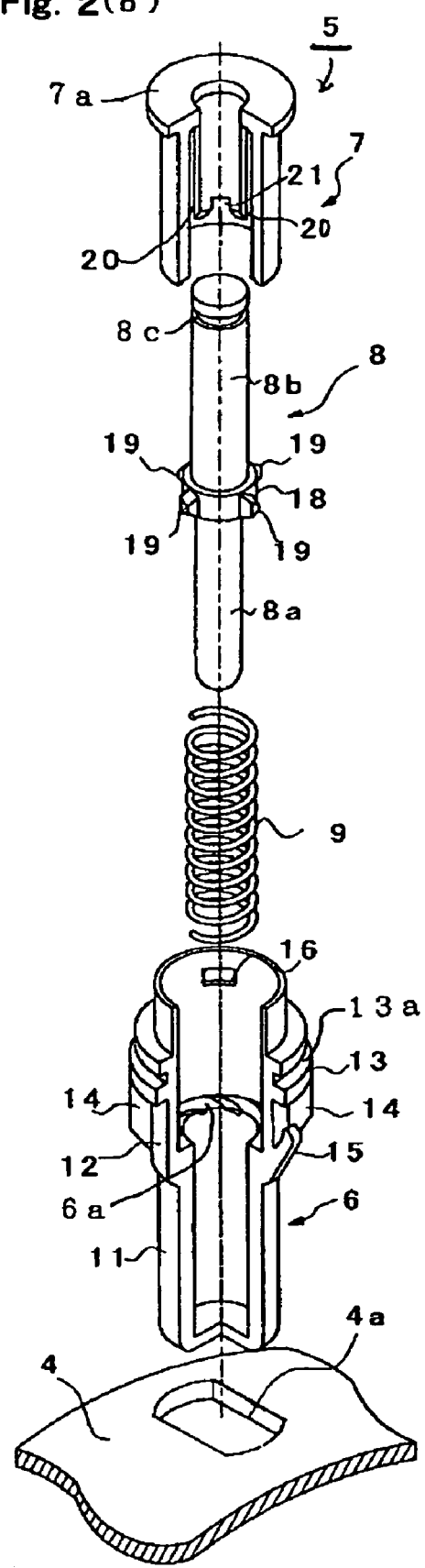
Figures 3A, 3B:
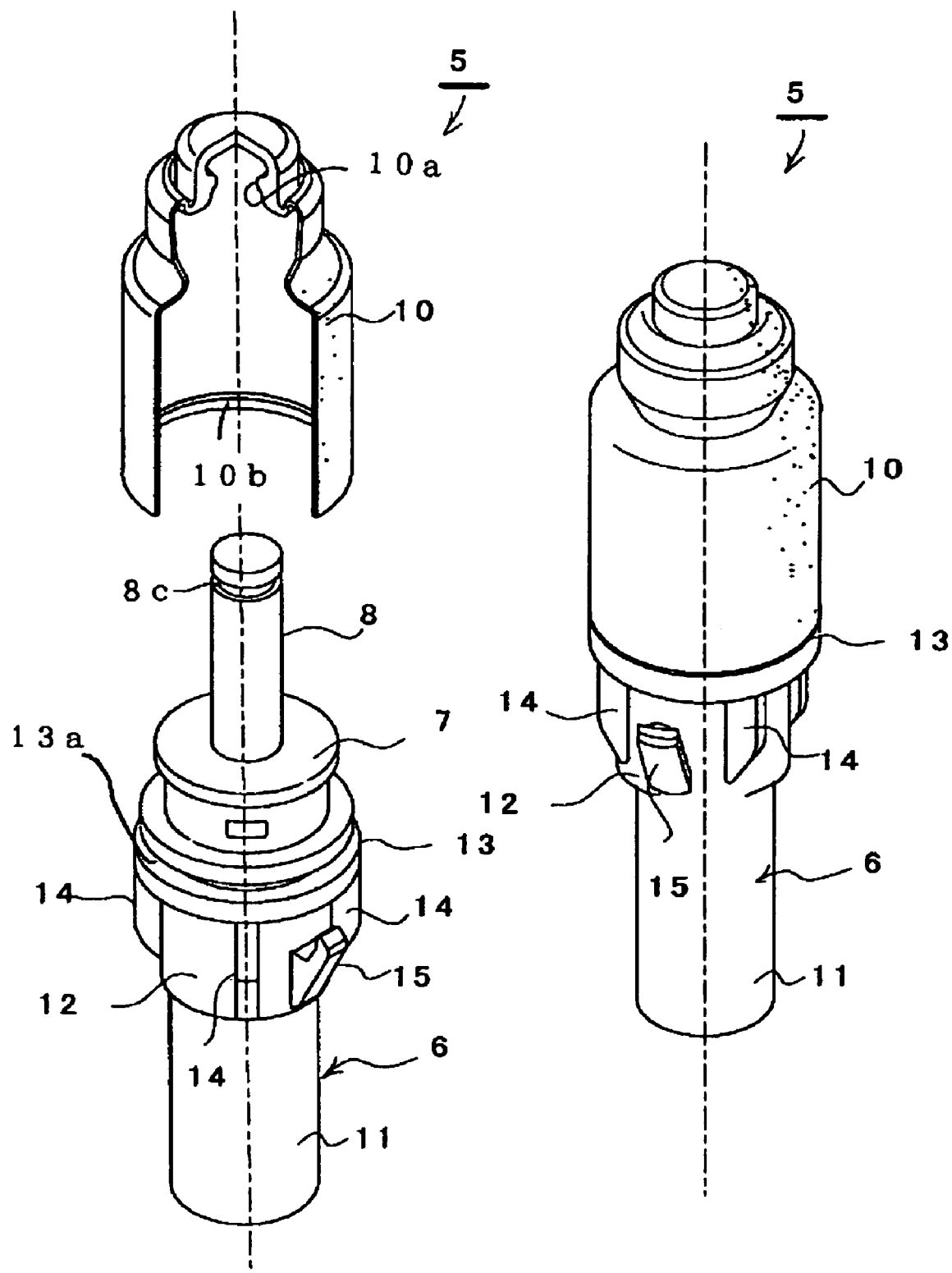
FIGS. 3(a) and (b) are a perspective view of the push-up device in an assembled state and a view similar thereto but partly shown in section.

Specifically, as shown in FIGS. 2(a) and (b), and FIGS. 3(a) and (b), the push-up device 5 includes a bottomed holder 6, a substantially cylindrical sleeve 7, the push rod 8, a coil spring 9 as a spring member, and an elasticized covering member 10, the holder 6 being configured to be engaged with and fixed to a mounting hole 4a formed in the inner panel 4, the sleeve 7 being engaged with and coupled to an upper inner peripheral portion of the holder 6, the push rod 8 being disposed so as to be slidable in the holder 6 and the sleeve 7 and protruding outward from a hole formed in a leading end of the sleeve 7, the spring member being disposed on and around an outer peripheral portion of the push rod 8 in the holder 6 and constantly biasing the push rod 8 in a protruding direction, the elasticized covering member being formed of a soft material engaged with a leading end of a protruding part of the push rod 8 protruding outward from the hole formed in the leading end of the sleeve 7, and the covering member covering a portion of the push rod 8 protruding from the sleeve 7. Each of the holder 6, the sleeve 7 and the push rod 8 is a resin molded product. The covering member 10 is a molded product made of a resin or rubber.

As shown in FIGS. 2(a) and (b), the holder 6 is integrally formed of a cylindrical portion 11 for housing the coil spring 9, an enlarged diameter portion 12 formed on an upper periphery of the cylindrical portion 11, and a flange portion 13 integrally formed in a substantially intermediate part of the enlarged diameter portion 12. The enlarged diameter portion 12 has a plurality of reinforcing ribs 14 (four reinforcing ribs in the shown embodiment) formed under the flange portion 13 and a circumferential groove 13a formed on an upper peripheral portion of the flange portion 13. The holder has a pair of locking claws 15 formed thereon at a distance of about 180 degrees between adjacent reinforcing ribs for the purpose for retaining. The respective locking claws 15 serve to sandwich the inner panel 4 between the flange portion 13 and the locking claws in such a state that the holder is disposed to pass through the mounting hole 4a of the inner panel 4. The holder has a pair of locking holes 16 formed therein at a distance of about 180 degrees above the circumferential groove 13a. On the other hand, the holder 6 has an inner circumferential stepped portion in an intermediate position in a vertical direction so as to have a large diameter above the stepped portion. The stepped portion has an upper end surface 6a formed with a plurality of inclined faces, which are formed in a substantially helical shape for serving as guides, although being shown in a simple way. The inclined faces serve to guide the push rod 8 along the inclination of the helical inclined faces in one direction by each certain angle (an angle of 22.5 degrees in the shown embodiment) whenever respective cams 19 of the push rod 8, which will be described later, are pressed against the inclined faces. In the shown embodiment, also when the respective cams 19 of the push rod 8 lifts from the helical inclined faces, the push rod 8 is rotated in the one direction by each certain angle (an angle of 22.5 degrees in the shown embodiment) since the respective cams 19 of the push rod 8 are brought into contact with unshown ribs.

The push rod 8 has a flange portion 18 circumferentially formed in a substantially intermediate portion in a vertical direction so as to have an enlarged diameter. The push rod has a portion under the flange portion 18 serving as a lower rod portion 8a passing through the coil spring 9 and a portion above the flange portion 18 serving as an upper rod portion 8b for a pushing operation. The lower rod portion 8a holds the coil spring 9 so as to be compressible and deformable between the bottom of the holder 6 and the flange portion 18 in such a state that the lower rod portion is disposed to pass through the coil spring 9. The upper rod portion 8b has an engageable groove 8c circumferentially formed in a portion thereof close to the leading edge thereof. On the other hand, the flange portion 18 has the plural cams 19 (four cams in the shown embodiment) formed on a peripheral portion thereof at equally spaced intervals so as to protrude. Each of the cams 19 is configured to have one end formed to be wider than the other end in a circumferential direction.

The sleeve 7 is formed in a substantially cylindrical shape, and has an enlarged diameter portion 7a formed around and on an upper end and a pair of projections 17 formed thereon under the enlarged diameter portion so as to protrude therefrom. In such a state that the sleeve is disposed to be housed in the holder 6, the sleeve is coupled to the holder 6 by bringing the enlarged diameter portion 7a of the sleeve into contact with a top end of the holder 6 and bringing the respective projections 17 of the sleeve into engagement with the respective engageable holes 16 of the holder 6. The sleeve 7 has an inner periphery formed with a plurality of guides (four guides in the shown embodiment). The guides are formed of a plurality of elongated grooves 20 and a plurality of short grooves 21, the elongated grooves being disposed at equally spaced intervals so as to extend in a vertical direction, and each of the short grooves being formed as an inverted recess in a lower end of a projection between adjacent elongated grooves 20. In the shown embodiment, the sleeve has an inner circumferential shape, which is formed of a projection having an elongated groove 20 and a short groove 21, a projection having an elongated groove 20 and a short groove 21, a projection having an elongated groove 20 and a short groove 21, and a projection having an elongated groove 20 and a short groove 21.

The covering member 10 is formed in a substantially cap shape and includes an engageable projection 10a formed on and around a reduced diameter portion of an upper inner periphery thereof and an engageable projection 10b formed on and around a lower inner periphery thereof. The covering member 10 is assembled so as to be vertically flexible with respect to the holder 6 and the push rod 8 in such a state that the upper engageable projection 10a is brought into engagement with the engageable groove 8c close to the leading end of the push rod 8 while the lower engageable projection 10b is brought into engagement with the circumferential groove 13a of the holder 6.

(Operation)

Figure 4A:
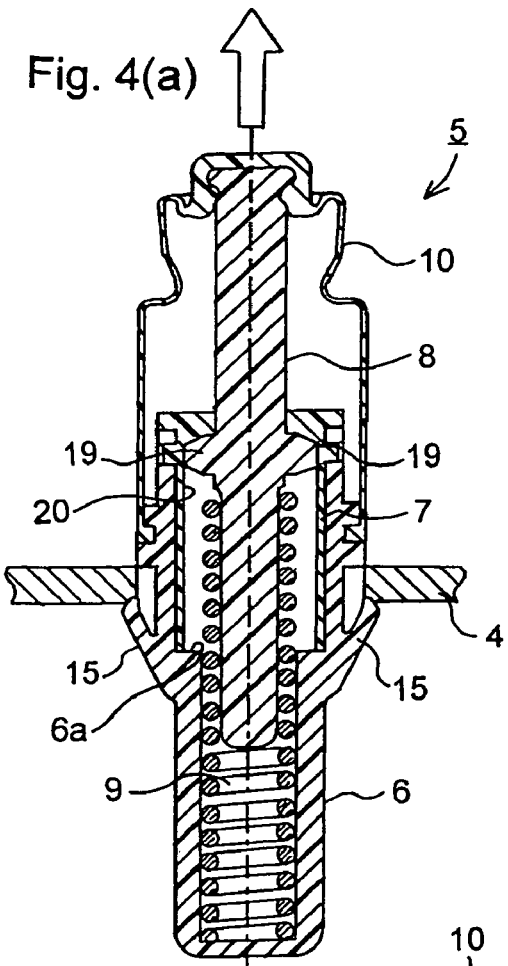
FIGS. 4(a) to (c) are schematic cross-sectional views showing an operation of the push-up device.
Figure 4B:
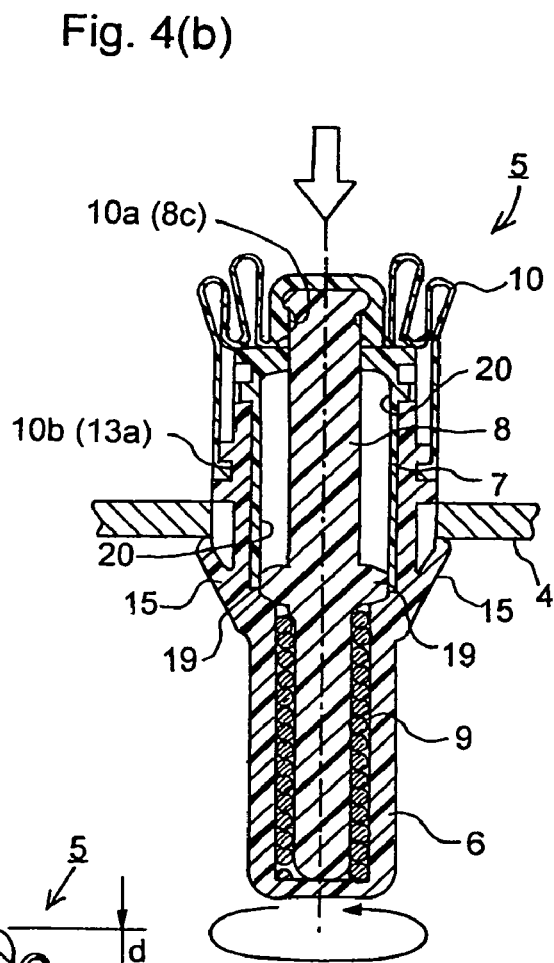
Figure 4C:
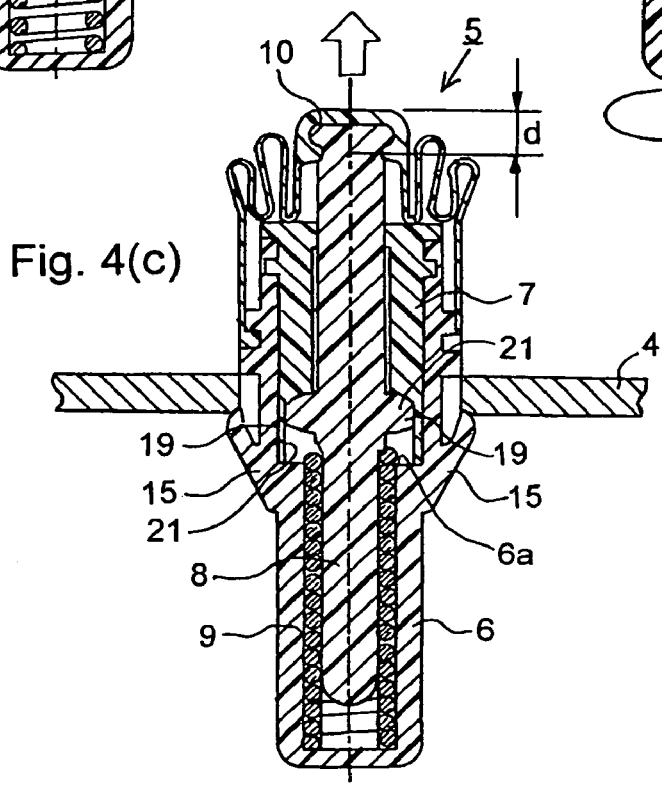

FIGS. 4(a) to (c) schematically show an operation of the push-up device 5 described above. First, FIG. 4(a) shows a state where the push rod 8 is projected to the maximum by the biasing force of the coil spring 9, in other words, a protruding position of the push rod 8. In this state, the respective cams 19 of the push rod 8 are slid up to the top along the respective elongated grooves 20 among the guides of the sleeve 7 in the push-push system. The lid 1 is swung about the hinge 2 by a certain angle in the opening direction by protrusion of the push rod 8. Thus, a worker is allowed to put, e.g. his or her finger into between the lid and the vehicle body to fully open the lid as shown in FIG. 1(b). The covering member 10 covers a counterpart including the protruding portion of the rod in the maximum protruding position of the push rod 8 and is helpful to provide the push-up device 5 with a good appearance and to provide the push-up device with dustproof and antifouling effects.

FIG. 4(b) shows a state where the lid 1 is depressed toward the vehicle body to the maximum (in the closing direction) from an open state shown in FIG. 1(b) in order to close the lid 1. In the push-push system under this state, when the respect cams 19 of the push rod 8 are brought into contact with the inclined faces formed on the upper stepped end surface 6a of the holder 6 after the respective cams are slid downward from the top ends of the elongated grooves 20 shown in FIG. 4(*a*), the respective cams are rotated by a certain angle, being guided by the inclinations of the inclined faces. Thus, the respective cams 19 confront the respective short grooves 21 instead of the elongated grooves 20 by such rotation as shown in FIG. 4(*c*).

FIG. 4(*c*) shows a state where the application of the depressing force to the lid 1 is stopped after the push rod 8 has been retracted to the maximum. When the application of the depressing force to the lid is stopped (a load toward a direction to retract the push rod 8 is released), the push rod 8 is slightly slid toward the protruding direction under the biasing action of the coil spring 9, followed by being stopped since the respective cams 19 are brought into contact with the top ends of the respective short grooves 21. In other words, the push rod 8 is held, by engagement of the cams 19 with the short grooves 21, at a retracted position with a protruding length decreased. The lid 1 is closed under the biasing action of the spring or the like toward in the closing direction, and then the lid is locked in the closed state by the locking system as in the conventional ones. The covering member 10 is helpful to provide the push-up device 5 with a dustproof effect and an antifouling effect, being compressed and deformed in response to the retracting movement of the push rod 8.

In order to set the lid 1 in an open state from the closed state again, the lid 1 is depressed toward the vehicle body (in the closing direction) as shown in FIG. 1(*a*), followed by stopping the application of the depressing force, after unlocking the locking system. The distance that the lid 1 is depressed is a difference between the position of the push rod 8 shown in FIG. 4(*b*) and the position of the push rod shown in FIG. 4(*c*), i.e. a length d shown in FIG. 4(*c*), which is substantially proportional to the length of the short grooves 21. In the push-push system, the push rod 8 is further slid in a retracting direction from the state shown in FIG. 4(*c*) against the biasing action of the coil spring 9, and the respective cams 19 are slid downward along the short grooves 21. When the respective cams 19 are brought into contact with the inclined faces formed on the upper stepped end surface 6a in the holder 6 that confront under the short grooves 21, the respective cams are rotated by the certain angle, being guided by the inclination of the inclined faces. By such rotation, the respective cams 19 are moved to the inlet of the elongated grooves 20 from the lower ends of the short grooves 21 through the inclined faces, and then the push rod 8 is slid toward the protruding direction along the elongated grooves 21 under the biasing action of the coil spring 9 and is switched to the protruding position shown in FIG. 4(*a*). Thus, the lid 1 is swung about the hinge 2 toward the opening direction by a certain angle by protrusion of the push rod 8.

(Modifications)

Figure 5:
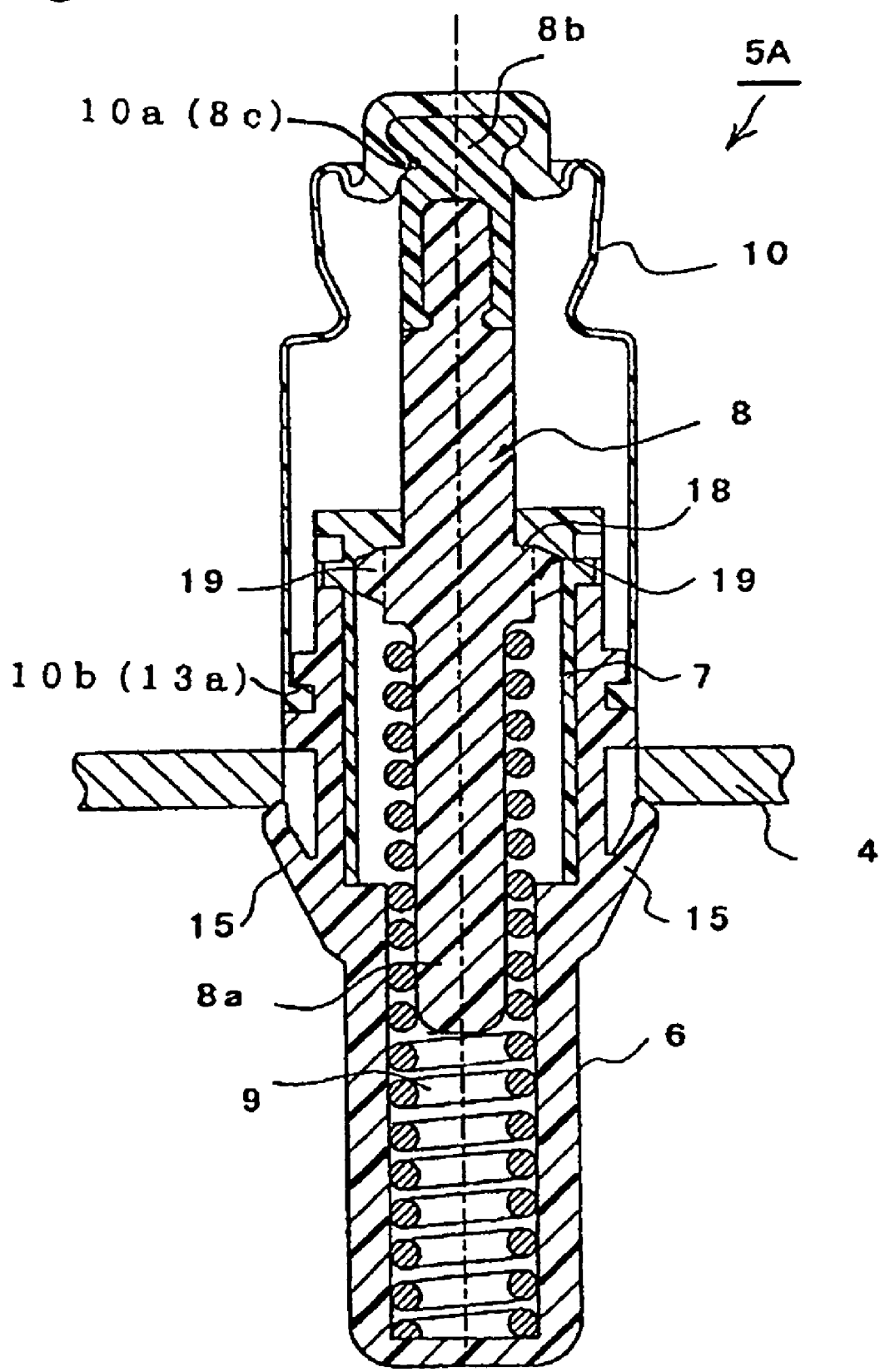
FIG. 5 is a schematic view showing a first modification of the push-up device, which is shown in the same state as the one shown in FIG. 4(a)
Figure 6:
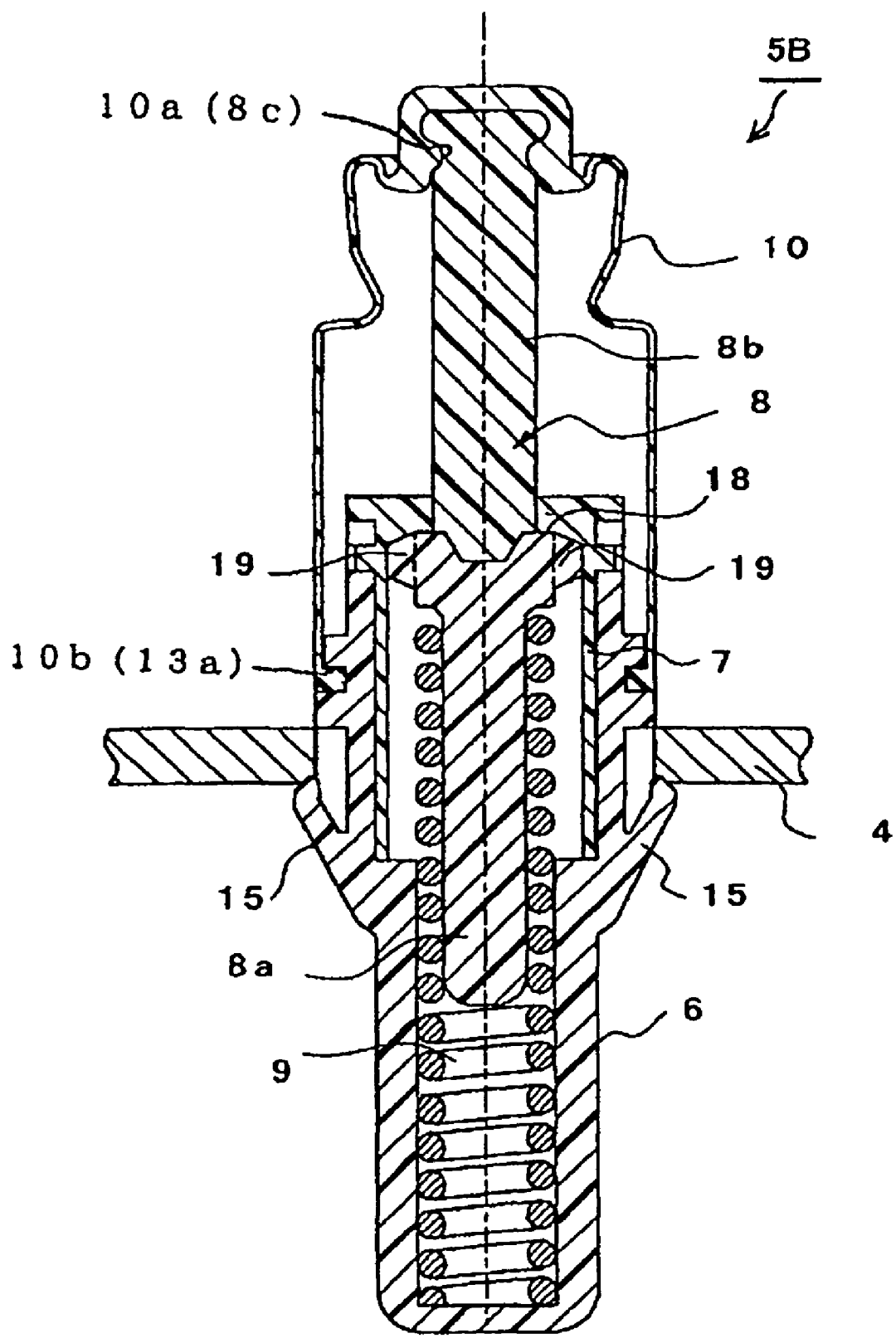
FIG. 6 is a schematic view showing a second modification of the push-up device, which is shown in the same state as the one shown in FIG. 4(a)
Figure 7:
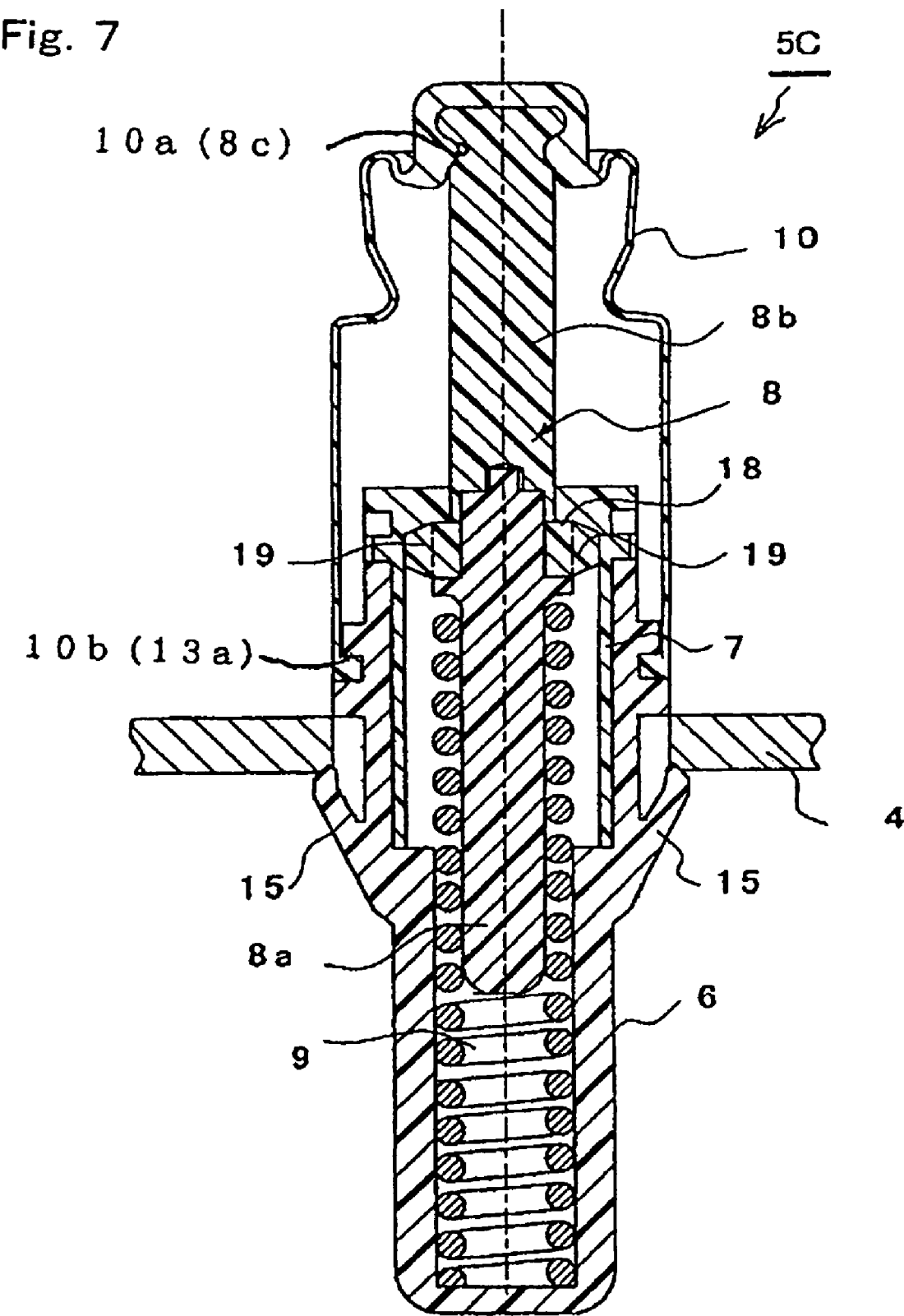
FIG. 7 is a schematic view showing a third modification of the push-up device, which is shown in the same state as the one shown in FIG. 4(a)

FIG. 5 to FIG. 7 show three modifications wherein the above-mentioned relationship between the push rod 8 and the cams 19 is modified. In FIG. 5 to FIG. 7, members and parts identical or similar to those shown in FIG. 1 to FIG. 4 are indicated by the same reference numerals, and redundant explanation is minimized.

The push rod 8 of the push-up device 5A shown in FIG. 5 has a lower rod portion 8a with the flange 18 and the cams 19 formed therein, the lower rod portion having an upper part extended. The push rod also has an upper rod portion 8b close to the leading edge thereof formed as a part separate from the lower rod portion. In this modification, the lower rod portion 8a is rotatably coupled to the upper rod portion 8b. By this arrangement, it is possible to maintain the rotational characteristic of the lower rod portion 8a at an excellent level and to ease a load applied to the covering member 10 since the upper rod portion 8b does not rotate even if the lower rod portion 8a rotates.

The push rod 8 of the push-up device 5B shown in FIG. 6 is divided into two sections of a lower rod portion 8a having the flange 18 and the cams 19 formed thereon and disposed to pass through the coil spring 9 and an upper rod portion 8b disposed at a higher position than the flange 18 and the cams 19 at a substantially intermediate portion in the vertical direction. In this modification, the lower rod portion 8a is rotatably coupled to the upper rod portion 8b. By this arrangement, it is likewise possible to maintain the rotational characteristic of the lower rod portion 8a at an excellent level and to ease a load applied to the covering member 10 since the upper rod portion 8b does not rotate even if the lower rod portion 8a rotates.

The push-up device 5C shown in FIG. 7 is similar to the push-up device shown in FIG. 6 in that the push rod 8 is divided into a lower rod portion 8a and an upper rod portion 8b and that the lower rod portion 8a is coupled to the upper rod portion 8b. In the arrangement shown in this figure, a flange 18 is formed of a part separate from the lower rod portion 8a and is rotationally assembled to the lower rod portion 8a. The flange 18 has a plurality of cams 19 formed thereon so as to protrude therefrom as described above. By the arrangement shown in this figure, it is easier to maintain the rotational characteristic of the flange 18 with the cams 19 as a rotational part at an excellent level in comparison with the arrangements shown in FIG. 6 and FIG. 7.

Obviously, numerous modifications and variations may be made to the push-up device according to the present invention unless they are away from the sprits of the present invention. Although the plural inclined faces are formed as guides on the upper end surface 6a of the stepped portion of the holder in the embodiment and the modifications, the guides may be formed as a separate part having similar inclined faces formed thereon and integrally mounted to a lower end of the sleeve 7 for example. The fuel lid, to which the present invention is applied, is not limited to automobiles as long as the fuel cap is used in a vehicle. The fuel lid, to which the present invention is applied, contains one disposed in several kinds of vehicle bodies with an engine, which are related to the civil engineering field, the building field, the agricultural field or the like. The lid may have a locking strip, an abutting part or the like as shown in FIG. 8 disposed on the inner side thereof as needed.

The entire disclosure of Japanese Patent Application No. 2006-121302 filed on Apr. 25, 2006 including specification, claims, drawings and summary are incorporated herein by reference in its entirety.

The invention claimed is:

1. A push-up device for a fuel lid, comprising:
a holder adapted to be attached to a panel under the fuel lid,
a cylindrical sleeve disposed in the holder, said cylindrical sleeve having a plurality of elongated grooves and a plurality of short grooves alternately arranged in an inner surface thereof at equal intervals and extending in a vertical direction,
a spring member disposed in the holder,
a push rod disposed in the holder and engaging the spring member so that the push rod is urged to protrude outwardly from the holder, and
a cam disposed between the push rod and the cylindrical sleeve and engaging the elongated grooves or the short grooves, wherein when a depressing force is applied to the push rod in a fuel lid closing state, the cam located in the short grooves is moved to the elongated grooves so that the push rod protrudes to a protruding position, and when the depressing force is applied to the push rod in the protruding position, the cam is located in the elongated grooves and is moved to the short grooves so that the push rod comes to a retracted position.

2. The push-up device for a fuel lid according to claim 1, wherein the cam is rotatably disposed on an outer peripheral portion of the push rod.

3. The push-up device for a fuel lid according to claim 1, further comprising a flexible covering member having a lower peripheral portion mounted to the holder and covering the push rod protruding from the sleeve.

4. The push-up device for a fuel lid according to claim 1, wherein the cylindrical sleeve is located at an upper part of the holder.

5. The push-up device for a fuel lid according to claim 4, wherein the elongated grooves and short grooves extend vertically from a lower peripheral edge of the cylindrical sleeve and have different lengths.

* * * * *